(12) United States Patent
Johnson

(10) Patent No.: US 12,546,078 B2
(45) Date of Patent: Feb. 10, 2026

(54) MEANS FOR PRESERVING GLACIER

(71) Applicant: Douglas Ellis Johnson, St. Paul, MN (US)

(72) Inventor: Douglas Ellis Johnson, St. Paul, MN (US)

(*) Notice: Subject to any disclaimer, the term of this patent is extended or adjusted under 35 U.S.C. 154(b) by 0 days.

(21) Appl. No.: 18/486,739

(22) Filed: Oct. 13, 2023

(65) Prior Publication Data
US 2025/0198107 A1    Jun. 19, 2025

(51) Int. Cl.
*E02D 3/00* (2006.01)

(52) U.S. Cl.
CPC .................... *E02D 3/00* (2013.01)

(58) Field of Classification Search
CPC ........................................ E02D 3/00
See application file for complete search history.

(56) References Cited

U.S. PATENT DOCUMENTS 6,042,305 A * 3/2000 Novich ................. C09K 17/50
106/900
2004/0162475 A1 * 8/2004 Pugh .......................... E02D 3/08
600/395
2016/0208450 A1 * 7/2016 Sartori ...................... E01H 5/10

FOREIGN PATENT DOCUMENTS

| | | | | |
|---|---|---|---|---|
| CN | 109577423 A | * | 4/2019 | ........... E03B 1/02 |
| DE | 102022003640 A1 | * | 4/2024 | ........... B01D 53/76 |
| EP | 3430887 A1 | * | 1/2019 | ........... E02D 3/115 |

* cited by examiner

*Primary Examiner* — Kyle Armstrong

(57) ABSTRACT

The field of the invention is surface albedo modification which applies to modifying the surface of areas of the earth to increase albedo. The invention relates to a means of preserving and restoring glaciers that are shrinking or receding due to climate change. Global warming has led to widespread shrinking of the cryosphere, with mass loss from ice sheets and glaciers. The shrinking of the cryosphere is accelerated by the ice-albedo feedback loop. The invention is a method of modifying the surface of a glacier by covering portions of it with highly reflective granules to increase albedo and reduce the melting of the glacier due to solar radiation. The invention may be used to preserve or restore glaciers and ice sheets that are melting due to climate change.

20 Claims, 1 Drawing Sheet

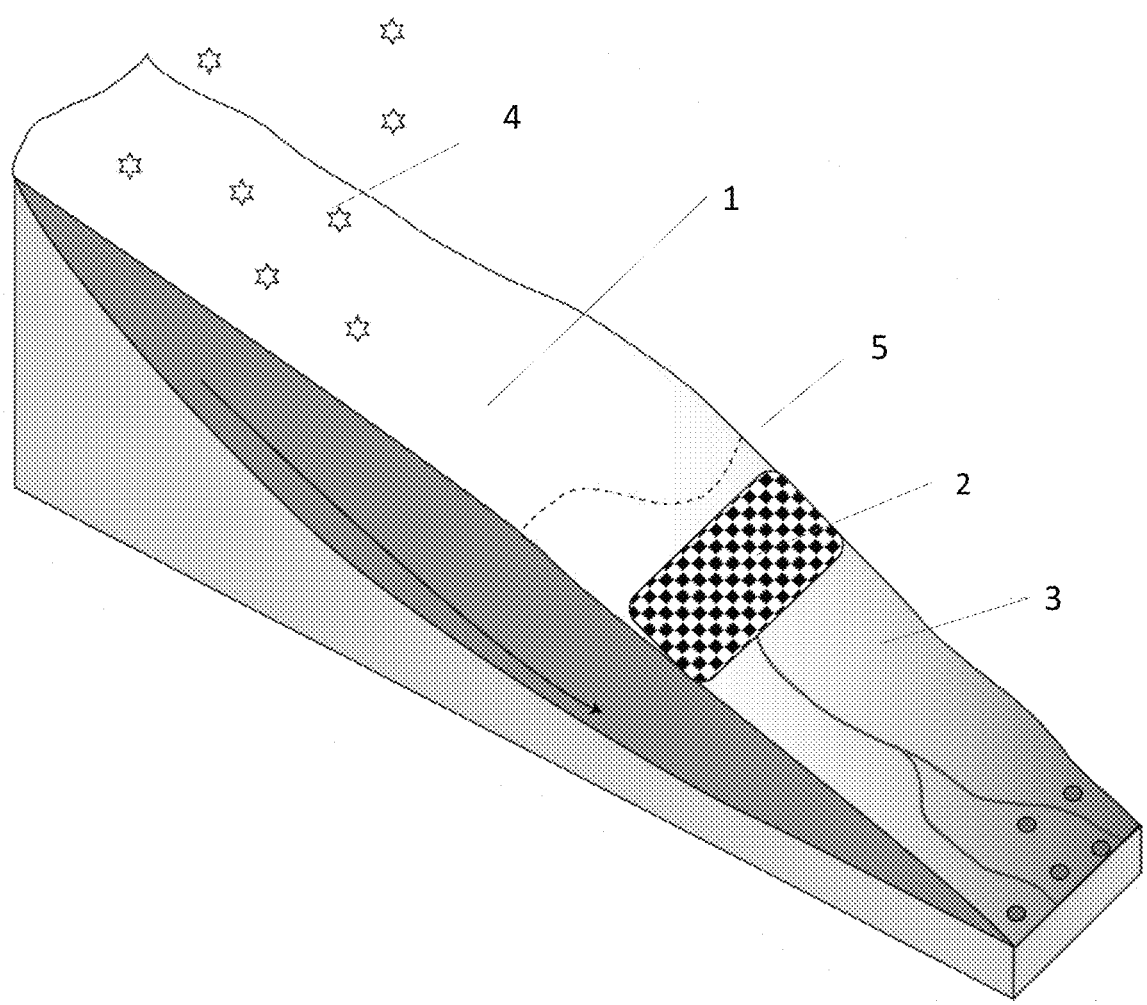

MEANS FOR PRESERVING GLACIER

CROSS-REFERENCE TO RELATED APPLICATIONS

This application claims the benefit of U.S. Provisional Patent Application No. 63/415,907, filed Oct. 13, 2022, EFS ID 46816069, which is incorporated by reference herein in its entirety.

BACKGROUND OF THE INVENTION

Field of the Invention

The field of the invention is surface albedo modification which applies to modifying the surface of areas of the earth to increase albedo. The invention relates to a means of preserving and restoring glaciers that are shrinking or receding due to climate change. This is also a means of preventing sea level rise due to shrinking glaciers, and mitigating the local effects of increased melting downstream such as reducing flooding or minimizing glacial lake outbursts.

Background

Global warming has led to widespread shrinking of the cryosphere, with mass loss from ice sheets and glaciers, reductions in Arctic sea ice extent and thickness, and increased permafrost temperature (Shukla et al., 2019). The shrinking of the cryosphere is accelerated by the ice-albedo feedback loop which plays an important role in global climate change. Shrinking ice area reduces surface albedo, leading to greater surface solar absorption, thus amplifying warming, and driving further melt.

Glacial ice covers 10-11 percent of all land. The majority, almost 90 percent, of Earth's ice mass is in Antarctica, while the Greenland ice cap contains 10 percent of the total global ice mass. Minor glaciers are found in North America, South America and Europe and Asia. Glaciers are projected to continue to decline throughout the 21st century (Pörtner et al., 2019). Foremost is the Greenland ice sheet, which has become the largest contributor to global sea-level rise, predominantly through increased surface melt and runoff (Hofer et al., 2020). The Greenland ice sheet has been losing mass since the 1990s at an accelerating rate. Surface mass loss from snow and ice are driven by absorption of solar radiation, which is influenced by surface albedo of the ice sheet (Mikkelsen et al., 2016) (Ryan et al., 2019). Meltwater on top of an ice sheet also serves to lower its albedo. There is a definite ablation zone where snow cover is lost for part of the year, and solar driven melting occurs, because bare ice, or ice covered by melt water, has a much lower albedo than snowcovered ice. (Noël et al., 2019). The area of the ablation zone has increased 33% since 1990. Outside of the polar regions, the Himalayas and Tibetan Plateau, known as the 'Third Pole', is one of the most important cryospheric regions in the world (Pant et al., 2018). Studies show that albedo feedback has been a primary contributor to increased glacier melting driven by warming over the Himalayas in recent decades (Ma et al., 2019), (Johnson & Rupper, 2020). The Eastern Himalayas could lose between one quarter and one half of their current glacier volume by 2050. (Wester et al., 2019).

DESCRIPTION OF RELATED ART

The art in the field of roofing teaches the use of highly reflective granules for use on roofing and asphalt roofing shingles to cool roofs. Highly reflective white granules are utilized in cooling roofing to increase the albedo of the roofing and reduce heating. Commercially available granules are available as cool roofing granules and utilized in the construction of shingles to reduce solar radiation on roofs. Engineered cool roofing granules are commercially available from US Silica, 3M Company and other commercial vendors. US Pat. No. 10,253,493B2 patent application describes a reflective particulate composition of a roofing granule which may have a solar reflectance of 70% or greater, for example, 80% or greater, or 90% or greater. For example, a US patent application describes "An uncolored roofing granule including a low solar absorption base and a low solar absorption and solar opaque coating presented on the base, the coating including a binder, a pigment, wherein the binder includes a curable component and a non-clay, thermally reactive curing agent. Surface albedo modification with hollow glass microspheres to reduce melting and preserve arctic sea ice is known in the art. The idea behind sea ice management is to target Arctic Sea ice directly. An organization called Arctic Ice Project a.k.a Ice911 (https://www.ice911.org) proposes to increase the surface albedo of sea ice by adding highly reflective hollow glass microspheres to the surface. The hollow glass microspheres are plausibly environmentally inert, being made primarily of silica. Ice911 claims that the spheres are not small enough to damage marine or human life (https://www.ice911.org/safety-testing). Pilot studies have been conducted in the Canadian Arctic using hollow glass microspheres of density of 0.12 g/cc, and their small-scale properties have been used in a global climate model to ascertain what impact they would have on the persistence of the sea ice in the spring melt season (Field et al., 2018). It has been taught in this art that the hydrophilic nature of the microspheres causes them to adhere to snow and ice and even migrate up inclined surfaces (Johnson, D et al Earths Future to be published). Further potential for use of these hollow glass microspheres on glacier surfaces has been taught (Manzara, T, et al (Cryosphere 2022).

SUMMARY OF THE INVENTION

The field of the invention is surface albedo modification which applies to modifying the surface of areas of the earth to increase albedo. Specifically, the invention is a method of modifying the surface of a glacier by covering portions of it with highly reflective granules to increase albedo and reduce the melting of the glacier due to solar radiation. A diagram of a glacier (1) is shown in FIG. 1. The part of the glacier that receives more mass by accumulation than it loses by ablation is the accumulation zone (4). The equilibrium-line altitude (5) marks the area or zone on a glacier where accumulation is balanced by ablation over a 1-year period. The part of a glacier below the equilibrium altitude line (5) which loses mass due to melting, sublimation, evaporation, and other processes is the ablation zone (3). The reflective granules of the invention cover an area of the glacier 2 in the ablation zone 3. The granules are selected to have physical properties that enable them to stay in place on the irregular sloped frozen and melting ice surfaces of the glacier. Glacier surfaces are often highly irregular and generally defined by having slopes, crevasses, streams, ponds, and debris. The granules are applied to a particular area of the glacier known as the ablation zone. This is the area on a glacier generally below the snowline where the bare ice or debris-covered ice is exposed to solar radiation. Bare and debris covered ice has a lower albedo, meaning it is absorbing more sunlight. This ablation area is where the ice is melting faster due to direct solar radiation and higher ambient temperatures. Typically, melt water is flowing over and down the surface during the melt. In this invention, high-density reflective particles are distributed in an even layer on the surface of the glacier in the ablation zone to increase the albedo of the glacier and reduce melt. The invention is also a manufactured article: a covering of highly reflective granules on the surface of a glacier. Also described is a method invention which is a method for reducing the melt of a glacier and hence increasing the mass balance of a glacier. Also described are methods for preventing sea level rise, and methods of restoring glacial ice.

PREFERRED EMBODIMENT OF THE INVENTION

In a preferred embodiment of the invention, a reflective covering of highly reflective granules is applied to the surface of the glacier. Preferably, the granules are applied in the ablation zone area of the glacier. The ablation zone is the area of exposed ice below the snowline where melting occurs during the melt season. Important physical characteristics of the granules are 1) high solar reflectance, 2) material, 3) granule size and shape, 3) granule surface texture, 4) granule hydrophobicity, 5) granule density, and 6) granule antimicrobial properties.

Solar Reflectance is the fraction of the incident solar energy which is reflected by the surface in question. Solar reflectance is also known as albedo. The best standard technique for its determination uses spectrophotometric measurements, with an integrating sphere to determine the reflectance at each different wavelength. The average reflectance is then determined by an averaging process, using a standard solar spectrum. This method is documented by ASTM (Amer. Soc. for Testing and Materials) as Standards E903 and E892. Preferably, the granules have high solar reflectance. In one or more embodiments, the solar reflectance for the granules is greater than 0.7, 0.8 or even 0.9 or higher. Granules with solar reflectance values of greater than 0.5 or 0.6 may be used in some embodiments.

A preferred material for the granule is calcined kaolin clay. Calcined kaolin clay exhibits high solar reflectance. Another advantage is that is non-toxic and not harmful to the environment. The granules selected are sufficient size (measured as average diameter) and density that they will mostly stay in place on inclined and irregular glacier surfaces during melting, and resist meltwater flow and downslope movement. The average diameter of the granules is generally between 0.1 and 5.0 millimeters. The size distribution of granules is typically determined by sieving, and can be either mono-modal or multimodal, such as bimodal or trimodal. A preferred shape for the granules is an irregular or angular shape to better adhere to ice surfaces and to resist flowing or sliding with meltwater or water from precipitation. A preferred surface for the granule is a rough surface because the friction between particles or between particles and the coated surface better resist sliding due to gravity or water flows. Preferably, the granules are hydrophilic or have hydrophilic surfaces to better adhere to ice or to surface liquid. In a preferred embodiment, granules will have jagged and angular shapes (as opposed to rounded), have density of 2.4 g/cm3 or higher, rough surfaces and are hydrophilic, all of which will improve the ability of the granule to stay in place on sloped melting ice surfaces having water flow during melt. Granules with these properties will be capable of staying in place on glacial surfaces with slopes up to 30 degrees, 45 degrees or even higher.

In one or more embodiments, the granules can include naturally-occurring mineral. In one or more exemplary embodiments, the granule can be or include natural sand. In one or more embodiments the granule can include granite. In one or more exemplary embodiments, the granule can be or include a ceramic granule or a ceramic coating. The granules can be or include silica and/or alumina in any suitable amounts. According to several exemplary embodiments, the granules include less than 80 wt %, less than 60 wt %, less than 40 wt %, less than 30 wt %, less than 20 wt %, less than 10 wt %, or less than 5 wt % silica.

On some glaciers such as the Greenland icesheet, blooms of pigmented glacier ice algae can lower ice albedo and accelerate surface melting. In another embodiment of the invention, the granules can also have anti-fouling and/or antimicrobial coatings to prevent glacial ice algae and snow algae from forming which can lead to darkening of the glacier or granule coating and increased solar absorption. Preferably, the antimicrobial coating is a metal oxide coating selected from those known to inhibit algae growth. Preferably, the granules will be free of nutrients such as mineral phosphorus (P) or iron (Fe)-bearing minerals which can promote the growth of algae which can darken the ice surface.

Light-absorbing particles on glacier surfaces include black carbon, mineral dust, volcanic ash and algae. Such particles can reduce glacier surface albedo, thus enhancing the melting process. In one or more embodiments of the invention, the granules are applied on glacier surfaces which contain light absorbing particles. The ice surface ablation zone of a glacier where the granules are applied may be covered with ice or firn (which is snow older than one year that has been compressed). In another embodiment, the granules are applied over snow or firn earlier in the melt season of the glacier and, as the snow or firn melts, the granules remain on the ice surface. In one or more embodiments the granules are applied to the glacier surface at a coverage rate so that granules will cover 80%, 90% or greater percentage of the ice surface area to be covered and typical coverage rates are about 1 kg/m$^2$, 1.5 kg/m$^2$ or 2 kg/m$^2$.

The invention is also for a preferred method to preserve or restore a glacier in which highly reflective granules are applied to the surface of glacier which is in the ablation zone area of the glacier. The preferred method includes:
1. Selecting a glacier
2. Determining the ablation zone of the glacier. Locating the ablation zone of the glacier may be accomplished by aerial methods using satellite or drone surveys to determine the albedo of glacial surfaces. Surfaces with lower albedo can be identified which are not covered with snow during the summer melt period.
3. Selecting a reflective granule material or materials as described in the preferred embodiment
4. Selecting a size distribution of granules to optimize coverage, maximize albedo and maximize the ability of the granule to stay in place on inclines. Multi-modal distributions of granule sizes can, for instance, optimize coverage and staying power. For example, larger sizes hold aggregations of granules in place while smaller size granules maximize coverage and minimize quantity required.
5. Selecting a portion of the ablation zone for treatment.
6. Covering a portion of the glacier with the selected granules Another embodiment is method of preventing sea level rise. This method involves selecting a glacier with a negative mass balance indicating that it is losing mass and contributing to sea level rise and employing the method of surface albedo modification for glaciers described herein to enough area of the glacier to cause the mass balance to become zero or positive.

Another embodiment is a method of restoring a glacier. This method involves selecting a glacier with a negative mass balance or a glacier remnant that has lost enough mass so as not to be defined as a glacier and employing the method of surface albedo modification for glaciers described herein to enough area of the ablation zone of the glacier to cause the mass balance to become positive for a few years to restore the glacier.

Example 1

We constructed an experimental setup consisting of a piece of 1" thick Styrofoam™ extruded polystyrene insulation. The Styrofoam insulation was covered with a thin black plastic film to provide for solar light absorption behind ice disks. The insulated plank was provided with four sections for test specimens. Side-by-side V-shaped sections with openings at their vertices all pointing toward one side of the plank were defined by attaching ½"×½" wooden strips to hold the ice disks in place and to contain the run-off and channel it into the receivers (plastic glasses). The Styrofoam plank was tilted sideways with the V-section vertices toward the down-side, towards the receiving glasses at a slope of 1 unit drop per 4.5 units run which equates to a 12.5-degree slope. The inclined Styrofoam plank test fixture was placed on a deck in the afternoon sun.

Four samples of ice disks about 7" diameter (representing sloped glacier surfaces) were constructed by freezing four aliquots of 350 g of water in four plastic pie covers, removing the ice disks from the covers, and placing them in the V-shaped sections. These disks had thinner edges than centers due to the shape of the pie covers, resulting in a larger diameter at the top of the disk than at the bottom. A first (control sample) ice-disk consisted of uncoated bare ice. The second and third ice disks were coated using two types of reflective calcined kaolin granules. The reflective calcined kaolin granules were obtained from US Silica, U.S. Silica Company, 8490 Progress Drive, Suite 300 Frederick, MD 21701, U.S.A, under the product name ArmourCool™ White Granules, product number 330535. The granules are composed of 95-100% Calcined aluminum silicate (calcined kaolin clay). ArmourCool granules are advertised to reflect 80% of solar radiation. ArmourCool-A granules are non-standard product of the same material which do not have the hydrophobic coating. ArmourCool-B granules are standard granule product which is supplied with a hydrophobic coating. For comparison, the fourth ice disk was coated with hollow glass microspheres HGMs. The hollow glass microsphere type (HGMs) chosen for use in this study was Potters Sphericel (R) 25P45 available from Potters Industries LLC 3222 Phoenixville Pike, Malvern, PA 19355, denoted 25P45-HGMs. The samples were constructed by carefully sprinkling a tablespoonful of particles on the ice on the larger side of the ice disk, which provided a uniform coverage. This amount equates to a coverage rate for the granules of approximately 0.5 kg/m² which is a standard coverage rate used for covering shingles with granules. For the HGMs the coverage rate by volume was the same but by weight about 10% as much as the granules.

The disks were each placed in one of the v-sections on the Styrofoam plank, larger-side-up, in the sunlight at 2:10 PM and observed until 5:13 PM when the ice was gone. Photos were taken to record the changes.

At 3:53 PM A little ice remained in the control and 25P45 samples, quite a lot of ice remained in the ArmourCool-A and ArmourCool-B. On the HGM sample, most of the 25P45HGMs had already run off the ice surface. By 4:10 pm the control sample was totally melted, the ArmourCool-A and ArmourCool-B had a 6" diameter ice disk left, from ⅛" to ¼" thick, and the HGM sample had about 1" diameter of ice left, about ¼" thick. The HGMs had run off the sloped melting ice almost completely and ended up in the glass. The ArmourCool-A and ArmourCool-B stayed in place, virtually none of these had run into the glass.

By 5:12 pm all the ice had melted. The ArmourCool samples remained in place with no distinguishment between the A and B types, while the hollow glass microspheres had run off almost completely. In conclusion, the experiment demonstrates that the granules stay in place on inclined melting ice and slow the rate of ice melting under solar radiation. The hollow glass microspheres do not stay in place on inclined melting surface. This result is surprising and contrary to what is taught in the art. Even though glass microspheres are described as surface albedo modification materials, they will not work well on inclined ice surfaces. This difference may be because the combination of the glass microspheres' density, small average diameter, and round shape cause them to become nearly fluidic and flow off inclined surfaces along with melt water. Thus, when used alone, they are ineffective as a surface albedo modification method on the inclined irregular surfaces of glaciers which compose nearly 100% of glacier surfaces.

Example 2

A representation of clear glacial ice was made by filling black plastic trays with dimensions 9"×5"×2" with water and placing in a freezer. The ice surface of one of the trays was coated with reflective calcined kaolin granules were obtained from US Silica, U.S. Silica Company, 8490 Progress Drive, Suite 300 Frederick, MD 21701, U.S.A, under the product name ArmourCool White Granules, product number 330535. The granules are composed of 95-100% Calcined aluminum silicate (calcined kaolin clay). The granules are ArmourCool-A granules are non-standard product of the same material which do not have the hydrophobic coating. The shape of the granules was angular and irregular. The surface of the ice of one of the trays, designated the test tray, was covered with the granules by sprinkling them over the tray using a sieve. Material was applied so that an estimated 90% or greater area of the ice surface was covered. The granule material was approximately in a single layer. After coating the surface, the tray was placed back in the freezer to refreeze for several minutes. The control tray was left untreated. The trays were placed in direct late afternoon sunlight at 4:10 pm on a slope of approximately 15%. After 1.5 hours nearly all the ArmourCool-A granules had remained in place on the inclined surface. Some water accumulated at the bottom of the tray and granules in this area slid down the submerged ice. The tray was then pierced then to prevent accumulation of water at the bottom). At 5:41 pm the slope of the tray was raised to approximately 45 degrees. At the conclusion of the experiment most of the bare ice had melted, and the granules on the test sample had remained in place at a 45-degree slope. This example demonstrates the effectiveness of the granules at staying in place on inclined ice surfaces and reducing the rate of ice melt.

Example 3—Field-Scale Sloped Ice Block Comparison

Spaces for forming sloped ice blocks (R1, R2, R3, and R4) on the Earth's surface were prepared by excavating spaces 10×10 ft, with the north edge 1 ft deep and the south edge 2 ft deep, with a flat sloped bottom surface. The sides of these spaces were lined with ¼" plywood. Thermal sensors were placed in the soil at the center of each space in vertically oriented 2-ft lengths of ½" PVC pipe, at depths of 1 inch, 1 ft and 2 ft below the soil surface. The four spaces were then lined with plastic film, filled with water, and allowed to freeze to a depth of about 10 inches. Then a hole was drilled through the ice at the deep edge of each space, and the underlying liquid water was pumped out, allowing the ice block to slope by about 1 ft in 10 (i.e., 10% grade). The spaces were then equipped with time-lapse cameras, and radiometers to measure incoming and outgoing short and long wavelength radiation.

The surfaces of the spaces were treated with albedo-modification materials on Feb. 19, 2023, before the Spring melt, when there was at least 10 inches of snow over the ice blocks. The specified quantity of each modification material for each block was divided into nine aliquots and distributed as evenly as possible over the snow covering the block using an appropriately-sized shaker and a 3×3 space template consisting of a 10-ft square of ¾" pvc pipe with two strings tied across it in each direction.

R1 was treated with 9 kg of ArmourCool white calcined irregularly-shaped kaolin particles of average particle size 1.0 mm, and size distribution range from 0.35 to 1.4 mm granules, R2 was treated with 23 g of Asbury brand type 5358 carbon black, R3 was treated first with 23 g of the same carbon black and then 9 kg of the same ArmourCool granules, and R4 was left untreated. Following the treatment, the blocks experienced continuing winter conditions of repeated snowfalls and partial melting/sublimation until late March. During the course of the late Winter it was noted that the originally 10" thick ice blocks were thinning due to soil heat permeation, and by the time of the melt event there was about 4 inches of ice thickness in each block as measured by pushing a slender rod through the snow cover so as to cause the least disturbance of the sample layers. Ground surface temperatures under each of the blocks remained near zero degrees C. until all the ice had melted, and rose rapidly after that transition point. (Table 1) Thus, these temperature readings give a good indication of when all the ice has melted for each of the blocks. In the pair with carbon black contamination, the R2 block with only carbon black melts first, then R3 (carbon black and granules) a day later. Both blocks without carbon black R1 (granules only) and R4 (control) completed thawing on the same day, two days later than R2 and R3. For the period after final melt April 14, the ground temperature of R1 with granules is about 3 degrees C. colder than that of R4 without granules. Thus, the higher albedo of R1 after snow/ice melt on Apr. 10, 2023 resulted in a 8 deg. C cooler surface temperature compared with R4 (and also R2 & R3). (Table 1) These comparisons of ice-melt timing were corroborated by time-lapse photography.

The albedo of the granule-treated snow was slightly less than that of untreated snow, while the albedo of the granule-treated carbon-black contaminated snow was much higher than that of the granule-free carbon-black contaminated snow (Table 2).

TABLE 1

Ground Temps ° C.

| | Bare Ice | | Ice w Black Carbon | |
| --- | --- | --- | --- | --- |
| Date | R1 w granules | R4 no granules | R3 w granules | R2 no granules |
| 4/2 | 0.81 | 0.19 | 0.38 | 0.81 |
| 4/3 | 0.75 | 0.19 | 0.31 | 0.81 |
| 4/4 | 0.81 | 0.13 | 0.38 | 0.81 |
| 4/5 | 0.81 | 0.25 | 0.38 | 0.75 |
| 4/6 | 0.75 | 0.19 | 0.38 | 0.81 |
| 4/7 | 0.81 | 0.13 | 0.38 | 0.75 |
| 4/8 | 0.81 | 0.19 | 0.38 | 0.81 |
| 4/9 | 0.81 | 0.13 | 0.44 | 0.94 |
| 4/10 | 0.94 | 0.31 | 2.63 | 10.56 |
| 4/11 | 7.38 | 5.88 | 18.19 | 18.63 |
| 4/12 | 17.56 | 19.00 | 23.38 | 22.56 |
| 4/13 | 20.00 | 23.56 | 24.38 | 23.94 |
| 4/14 | 20.75 | 25.19 | 24.44 | 25.19 |

TABLE 2

Average Daily Albedo

| | Bare Ice | | Ice w Black Carbon | |
| --- | --- | --- | --- | --- |
| Date | R1 w granules | R4 no granules | R3 w granules | R2 no granules |
| 4/2 | 0.55 | 0.55 | 0.55 | 0.55 |
| 4/3 | 0.54 | 0.53 | 0.53 | 0.50 |
| 4/4 | 0.60 | 0.58 | 0.57 | 0.68 |
| 4/5 | 0.51 | 0.51 | 0.50 | 0.44 |
| 4/6 | 0.45 | 0.47 | 0.45 | 0.39 |
| 4/7 | 0.42 | 0.43 | 0.40 | 0.36 |
| 4/8 | 0.37 | 0.39 | 0.30 | 0.29 |
| 4/9 | 0.34 | 0.37 | 0.22 | 0.25 |
| 4/10 | 0.30 | 0.32 | 0.19 | 0.22 |
| 4/11 | 0.28 | 0.22 | 0.20 | 0.20 |
| 4/12 | 0.29 | 0.21 | 0.22 | 0.17 |
| 4/13 | 0.30 | 0.21 | 0.22 | 0.14 |
| 4/14 | 0.30 | 0.21 | 0.23 | 0.15 |

Thus it is shown that granules increase the albedo and reduce the melting rate of ice that has been treated with carbon black.

The invention claimed is:

1. A method to preserve a glacier wherein granules are distributed on a sloped ice surface of a glacier wherein the granules have an average size greater than 1 mm and less than 4 mm, a density greater than 1.0 g/cc, and reflectance is greater than 0.5.

2. The method of claim 1 wherein the solar reflectance of the granules is at least 0.6.

3. The method of claim 2 wherein the solar reflectance of the granules is at least 0.8.

4. The method of claim 1 wherein the density of the granules is greater than 1.5 g/cc.

5. The method of claim 1 wherein the granules are a naturally occurring mineral selected from the group consisting of calcined kaolin clay, natural sand or granite.

6. The method of claim 1 wherein the granules comprise less than 80 wt % silica.

7. The method of claim 1 wherein the granules have a multi modal size distribution.

8. The method of claim 1 where the granules are irregularly shaped.

9. The method of claim 1 wherein the granules have a rough or high friction surface.

10. The method of claim 1 wherein the granules comprise an antimicrobial coating.

11. The method of claim 1 wherein the surface of the granules is hydrophilic.

12. The method of claim 1 wherein the surface of the granules is hydrophobic.

13. The method of claim 12 wherein the antimicrobial coating comprises a metal oxide.

14. The method of claim 1 wherein the granules have a ceramic coating.

15. The method of claim 1 wherein the glacial surface slope is greater than 15 degrees.

16. The method of claim 1 wherein the glacier surface comprises snow, bare ice, mineral dust, black carbon, and biological material.

17. The method of claim 1 to preserve or restore a glacier wherein reflective granules are applied to the sloped surface of a glacier comprising the steps:
   a. selecting a glacier;
   b. determining the ablation zone of the glacier;
   c. selecting a reflective granule of particular material, shape, and size distribution;
   d. selecting a coverage rate of granules;
   e. selecting the portion of the ablation zone on which to spread the granules; and
   f. covering the selected portion with the granules at the selected coverage rate.

18. A method of reducing the rate of sea-level rise by reducing the melting rate of a glacier according to the method of claim 17.

19. The method of claim 1 wherein the granules are comprised of calcined kaolin clay.

20. The method of claim 19 wherein the granules have a hydrophobic coating.

* * * * *